United States Patent
Tanaka et al.

(10) Patent No.: US 10,761,178 B2
(45) Date of Patent: Sep. 1, 2020

(54) IN-VEHICLE SYSTEM

(71) Applicant: TOYOTA JIDOSHA KABUSHIKI KAISHA, Toyota-shi, Aichi-ken (JP)

(72) Inventors: Kuniaki Tanaka, Nagoya (JP); Kentaro Asai, Okazaki (JP)

(73) Assignee: TOYOTA JIDOSHA KABUSHIKI KAISHA, Toyota-shi (JP)

( * ) Notice: Subject to any disclaimer, the term of this patent is extended or adjusted under 35 U.S.C. 154(b) by 0 days.

(21) Appl. No.: 16/203,821

(22) Filed: Nov. 29, 2018

(65) Prior Publication Data
US 2019/0170850 A1 Jun. 6, 2019

(30) Foreign Application Priority Data
Dec. 4, 2017 (JP) .................. 2017-232913

(51) Int. Cl.
| | | |
|---|---|---|
| *G01S 5/00* | (2006.01) | |
| *G08B 25/00* | (2006.01) | |
| *G01C 21/30* | (2006.01) | |
| *G01S 19/16* | (2010.01) | |
| *G01S 19/17* | (2010.01) | |
| *G01C 21/00* | (2006.01) | |
| *G01S 19/42* | (2010.01) | |

(52) U.S. Cl.
CPC .......... *G01S 5/0027* (2013.01); *G01C 21/005* (2013.01); *G01C 21/30* (2013.01); *G01S 19/16* (2013.01); *G01S 19/17* (2013.01); *G01S 19/42* (2013.01); *G08B 25/00* (2013.01)

(58) Field of Classification Search
CPC .... G01S 5/0027; G01S 19/42; G01S 2205/00; G01S 19/16; G01S 19/17; G01C 21/005; G01C 21/30; G08B 25/00
See application file for complete search history.

(56) References Cited

U.S. PATENT DOCUMENTS

| | | | |
|---|---|---|---|
| 6,246,376 B1 * | 6/2001 | Bork ...................... | G01S 1/047 |
| | | | 342/357.34 |
| 2005/0134503 A1 * | 6/2005 | Colley .................... | G01S 19/05 |
| | | | 342/357.58 |
| 2006/0080030 A1 * | 4/2006 | Okude ................... | G01C 21/32 |
| | | | 701/452 |

(Continued)

FOREIGN PATENT DOCUMENTS

| | | |
|---|---|---|
| JP | S62140080 A | 6/1987 |
| JP | 2005-217526 A | 8/2005 |

*Primary Examiner* — Dinh Nguyen
(74) *Attorney, Agent, or Firm* — Hunton Andrews Kurth LLP

(57) ABSTRACT

An in-vehicle system includes: a position information reception unit configured to receive position information from a satellite positioning system; a first control unit; a communication line connected to the first control unit; and a second control unit that is connected to the first control unit through the communication line and has a first conversion process unit configured to convert a datum of the position information. The first control unit is configured to transmit the position information received by the position information reception unit to the second control unit through the communication line, and the second control unit is configured to convert a datum of the position information received from the first control unit by the first conversion process unit.

3 Claims, 11 Drawing Sheets

(56) References Cited

U.S. PATENT DOCUMENTS

| | | | |
|---|---|---|---|
| 2009/0254270 A1* | 10/2009 | Yu | G01C 21/26 701/532 |
| 2016/0078700 A1* | 3/2016 | Yeh | G07C 9/00309 340/5.61 |

* cited by examiner

IN-VEHICLE SYSTEM

INCORPORATION BY REFERENCE

The disclosure of Japanese Patent Application No. 2017-232913 filed on Dec. 4, 2017 including the specification, drawings and abstract is incorporated herein by reference in its entirety.

BACKGROUND

1. Technical Field

The present disclosure relates to an in-vehicle system.

2. Description of Related Art

There is an in-vehicle communication system that includes a center and an in-vehicle device equipped with a navigation device and a communication device, and that performs data communication between the center and the communication device of the in-vehicle device by a communication method of either packet switching communication or circuit switching communication. Position information acquired by the navigation device is transmitted to the center through the communication device (e.g., see Japanese Patent Application Publication No. 2005-217526 (JP 2005-217526 A)).

SUMMARY

In the in-vehicle communication system disclosed in JP 2005-217526 A, the datum of position information acquired by the navigation device is not taken into account when this position information is transmitted to the center or another in-vehicle device. Datum conversion is required when the datum of position information acquired by the navigation device and the datum of position information used by the center or another in-vehicle device are different from each other.

Therefore, the present disclosure provides an in-vehicle system that can convert a datum.

A first aspect of the disclosure provides an in-vehicle system including: a position information reception unit configured to receive position information from a satellite positioning system; a first control unit that includes the position information reception unit or is connected to the position information reception unit; a communication line connected to the first control unit; and a second control unit that is connected to the first control unit through the communication line and has a first conversion process unit configured to convert a datum of the position information. The first control unit is configured to transmit the position information received by the position information reception unit to the second control unit through the communication line, and the second control unit is configured to convert a datum of the position information received from the first control unit by the first conversion process unit.

According to the first aspect, the datum of position information received by the position information reception unit can be converted by the first conversion process unit.

Therefore, an in-vehicle system that can convert a datum can be provided.

In the first aspect, the in-vehicle system may include a communication unit configured to perform wireless data communication with a server including a second conversion process unit configured to convert a datum of position information from the satellite positioning system. The first control unit may include the communication unit or be connected to the communication unit, and may be configured to transmit the position information received by the position information reception unit to the server through the communication unit.

According to the above configuration, position information with the datum not converted can be transmitted to the server.

Therefore, an in-vehicle system that can convert the datum of position information to be used by the second control unit as well as transmit position information with the datum not converted to the server, can be provided.

In the first aspect, the in-vehicle system may include a communication unit that performs wireless data communication with a server. The first control unit may include the communication unit or be connected to the communication unit, and may be configured to transmit the position information received by the position information reception unit to the second control unit through the communication line. The second control unit may be configured to convert the datum of the position information received from the first control unit by the first conversion process unit and transmit the position information with the datum converted to the first control unit through the communication line. The first control unit may be configured to transmit the position information with the datum converted received from the second control unit to the server through the communication unit.

According to the above configuration, position information with the datum converted by the second control unit can be transmitted to the server.

Therefore, an in-vehicle system that can convert both the datums of position information to be used by the second control unit and position information to be transmitted to the server can be provided.

A second aspect of the disclosure provides an in-vehicle system including: a position information reception unit configured to receive position information from a satellite positioning system; a first control unit that includes the position information reception unit or is connected to the position information reception unit; a communication line connected to the first control unit; and a second control unit connected to the first control unit through the communication line. The first control unit may have a first conversion process unit configured to convert a datum of the position information, the first control unit may be configured to convert a datum of the position information received by the position information reception unit by the first conversion process unit and to transmit the position information with the datum converted to the second control unit through the communication line.

According to the above configuration, the datum of position information received by the position information reception unit can be converted by the first conversion process unit.

Therefore, an in-vehicle system that can convert a datum can be provided.

In the second aspect, the in-vehicle system may include a communication unit configured to perform wireless data communication with a server. The first control unit may include the communication unit or be connected to the communication unit, and the first control unit may be configured to convert the datum of the position information received by the position information reception unit by the first conversion process unit and to transmit the position information with the datum converted to the server through the communication unit.

According to the second aspect, position information received by the position information reception unit can be transmitted to the second control unit and the server after the datum of the position information is converted by the first conversion process unit.

Therefore, an in-vehicle system that can convert the datum of position information to be used by the second control unit and the server can be provided.

In the second aspect, the in-vehicle system may include a communication unit configured to perform wireless data communication with a server including a second conversion process unit configured to convert a datum of position information from the satellite positioning system. The first control unit may include the communication unit or be connected to the communication unit, and may be configured to transmit the position information received by the position information reception unit to the server through the communication unit.

According to the above configuration, the datum of position information received by the position information reception unit can be converted by the first conversion process unit, and position information with the datum not converted can be transmitted to the server.

Therefore, an in-vehicle system that can convert a datum can be provided.

In the first and second aspect, the datum of the position information received by the position information reception unit may be a global datum, and a datum into which the datum of the position information is converted by the first conversion process unit may be a datum of a region where a vehicle equipped with the in-vehicle system is located.

According to the above configuration, position information based on a world-wide datum received by the position information reception unit can be converted into position information based on a regional datum by the first conversion process unit.

Therefore, an in-vehicle system that can convert position information based on a world-wide datum into position information based on a regional datum can be provided.

A third aspect of the disclosure provides an in-vehicle system including: a position information reception unit configured to receive position information from a satellite positioning system; a first control unit configured to use, as a first datum, only position information obtained from the position information reception unit; and a second control unit configured to receive from the first control unit the position information obtained from the position information reception unit and use the position information as a second datum.

According to the third aspect, the datum of position information received by the position information reception unit can be converted by the first conversion process unit.

Therefore, an in-vehicle system that can convert a datum can be provided.

In the first to third aspect, the in-vehicle system may not include any position information reception unit configured to receive position information from the satellite positioning system, other than the position information reception unit.

According to the above configuration, the configuration can be simplified.

Therefore, an in-vehicle system that can convert a datum while having a simple configuration can be provided.

BRIEF DESCRIPTION OF THE DRAWINGS

Features, advantages, and technical and industrial significance of exemplary embodiments of the disclosure will be described below with reference to the accompanying drawings, in which like numerals denote like elements, and wherein.

DETAILED DESCRIPTION OF EMBODIMENTS

An embodiment in which an in-vehicle system, a data communication system, an in-vehicle system control method, and a program control method of the present disclosure are applied will be described below.

Embodiment

Figure 1:
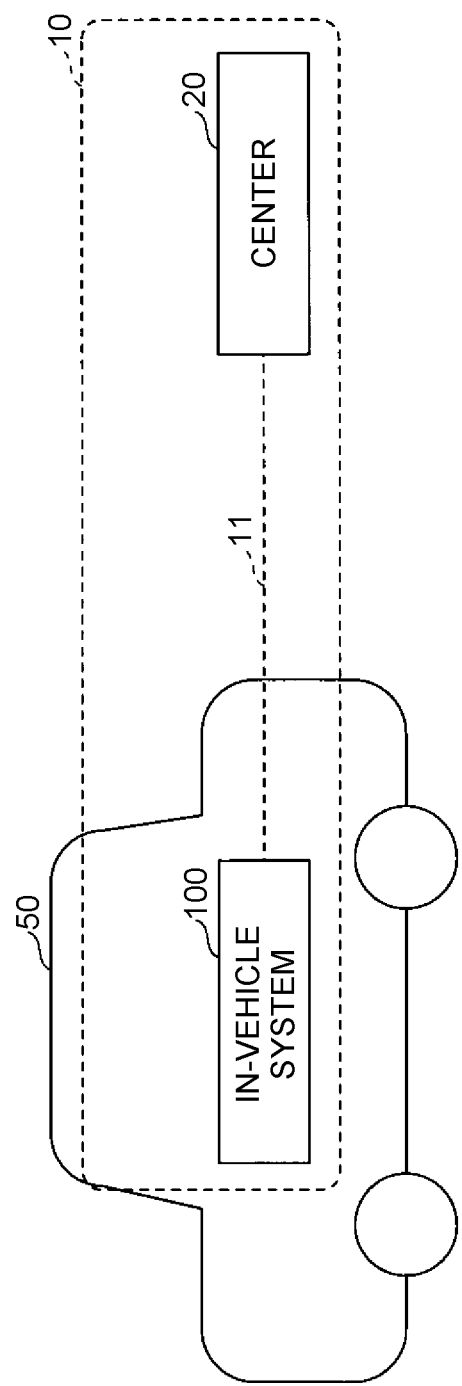
FIG. 1 is a view showing the hardware configuration of a data communication system 10 of an embodiment.

FIG. 1 is a view showing the hardware configuration of a data communication system 10 of the embodiment. The data communication system 10 includes a center 20 and an in-vehicle system 100 that is installed in a vehicle 50. The center 20 and the in-vehicle system 100 can communicate with each other through a communication network 11 including a wireless communication network, such as a mobile communication network or an Internet network built up of a large number of base stations. FIG. 1 shows one in-vehicle system 100, but in reality a plurality of in-vehicle systems 100 installed in a plurality of vehicles 50 is configured to be able to communicate with the center 20 through the communication network 11.

The center 20 is an aggregate of one or more computers (information processing devices). The center 20 can also be regarded as a server or a central server including one or more computers (information processing devices).

The center 20 receives position information and other information from the in-vehicle system 100 of the vehicle 50, and provides various services etc. using the received position information. Examples of such various services include an emergency report service and a theft notification and tracking service. The emergency report service is a service in which, when an airbag of the vehicle 50 is activated and the center 20 receives position information, information indicating the activation of the airbag, etc. from the in-vehicle system 100, the center 20 connects a telephone line to the in-vehicle system 100 and an operator at the center 20 talks with an occupant of the vehicle 50. The theft notification and tracking service is a service in which, when an alarm system of the vehicle 50 is activated and the center 20 receives position information, information indicating the activation of the alarm system, etc. from the in-vehicle system 100, the center 20 communicates with the in-vehicle system 100 and tracks the position of the vehicle 50.

For example, the vehicle 50 is an electric vehicle (EV), plug-in hybrid vehicle (PHV), hybrid vehicle (HV), gasoline vehicle, or diesel vehicle. The in-vehicle system 100 installed in the vehicle 50 has functions such as communicating with the center 20, and receiving position information indicating a current position of the vehicle 50 obtained by the Global Positioning System (GPS) that is an example of a satellite positioning system. The specific configuration of the in-vehicle system 100 will be described later.

Figure 2:
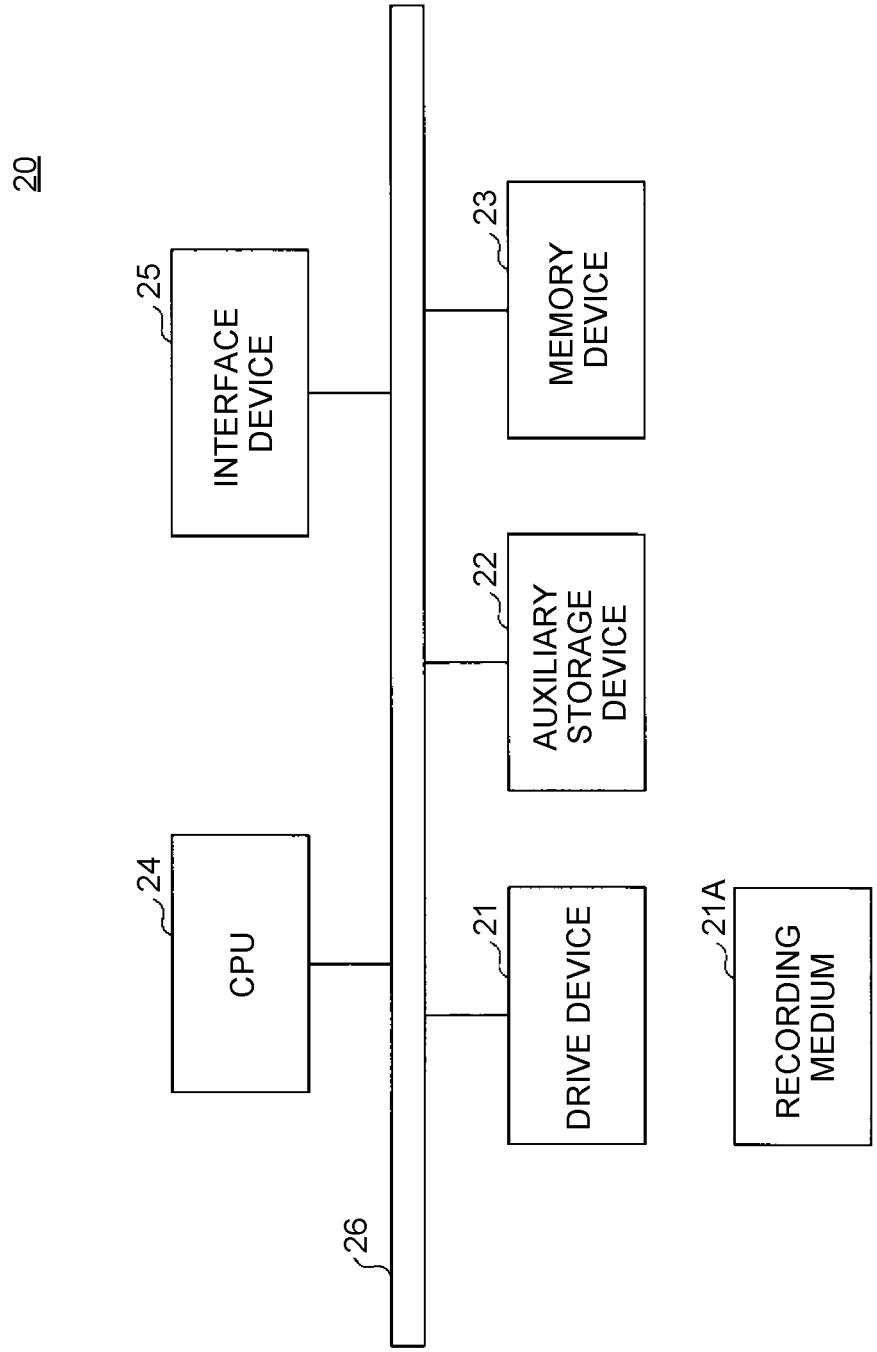
FIG. 2 is a view showing the hardware configuration of a computer that realizes a center 20 of the embodiment.

FIG. 2 is a view showing the hardware configuration of a computer that realizes the center 20 of the embodiment. The center 20 has a drive device 21, an auxiliary storage device 22, a memory device 23, a central processing unit (CPU) 24, an interface device 25, etc. These devices are connected to one another through a bus 26.

Of these devices, the drive device 21 is realized by a reading device of a recording medium 21A that is a CD-ROM, an SD memory card, or the like. The auxiliary storage device 22 is realized by a hard disk drive (HDD). The memory device 23 is realized by a random access memory (RAM) and a read only memory (ROM). The interface device 25 is realized by an input-output interface or a communication interface.

A program that realizes processes at the center 20 is provided by the recording medium 21A that is a CD-ROM, an SD memory card, or the like. When the recording medium 21A storing the program is set in the drive device 21, the program is installed from the recording medium 21A onto the auxiliary storage device 22 through the drive device 21. However, it is not absolutely necessary to install the program from the recording medium 21A, and the program may instead be downloaded from another computer through a network. The auxiliary storage device 22 stores the installed program as well as required files, data, etc.

Upon receiving a command to start the program, the memory device 23 reads the program from the auxiliary storage device 22 and stores the program. The CPU 24 executes functions related to the center 20 in accordance with the program stored in the memory device 23. The interface device 25 is used as an interface through which the center 20 is connected to the network.

Figure 3:
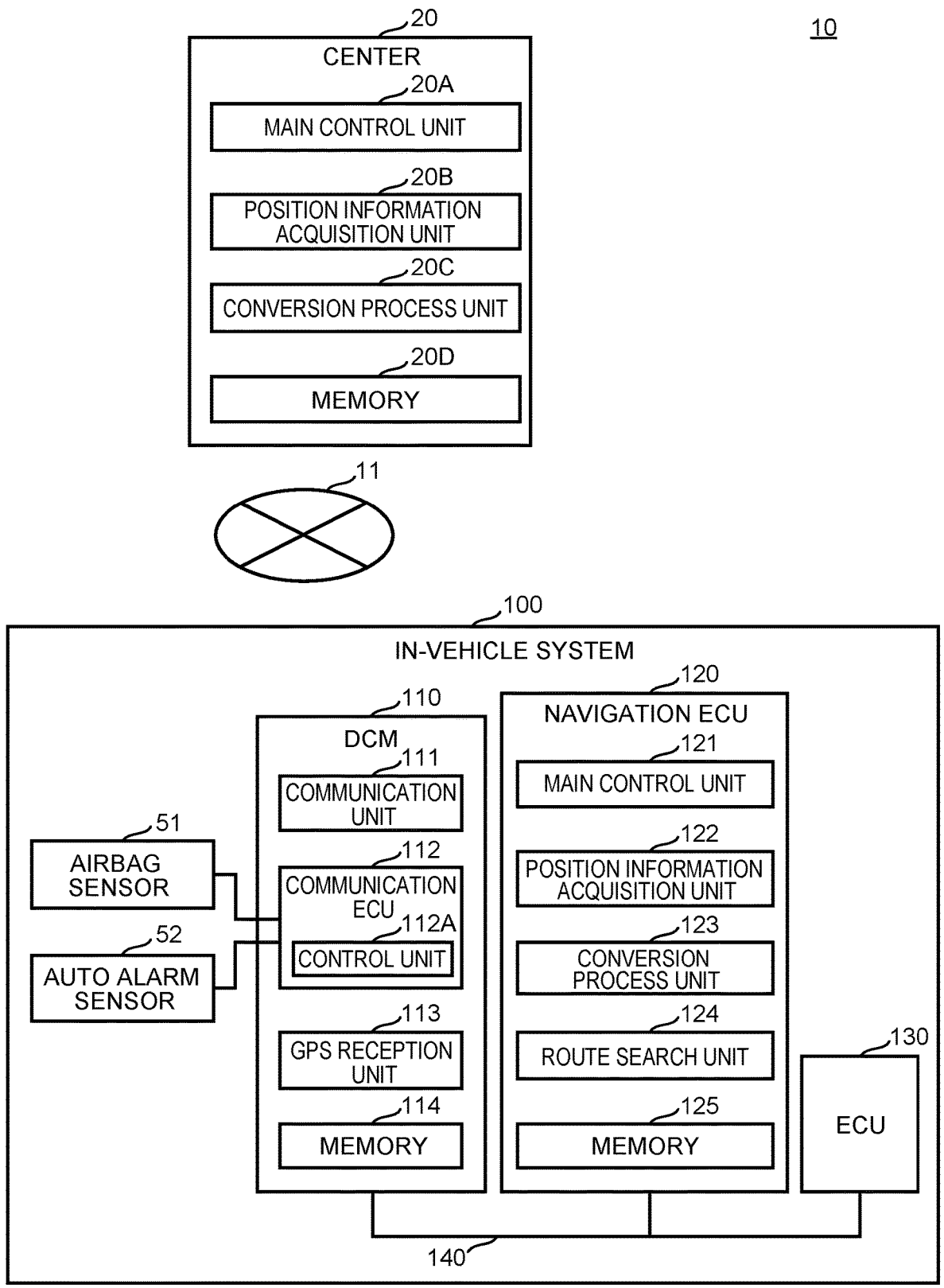
FIG. 3 is a view showing the internal configurations of the center 20 and an in-vehicle system 100 of the data communication system 10.

FIG. 3 is a view showing the internal configurations of the center 20 and the in-vehicle system 100 of the data communication system 10.

The center 20 includes a main control unit 20A, a position information acquisition unit 20B, a conversion process unit 20C, and a memory 20D. The main control unit 20A, the position information acquisition unit 20B, and the conversion process unit 20C are represented as functional blocks showing the functions of the program executed by the center 20. The memory 20D represents the functions of the auxiliary storage device 22 and the memory device 23 (see FIG. 2).

The main control unit 20A is a control unit that performs the processes of the emergency report service, the theft notification and tracking service, etc. and various other processes to be performed at the center 20. The position information acquisition unit 20B acquires position information on the vehicle 50 from the in-vehicle system 100 of the vehicle 50. The conversion process unit 20C performs a process of converting the datum of the position information on the vehicle 50 acquired by the position information acquisition unit 20B from a world-wide datum into a local datum that is used by the center 20. The conversion process unit 20C is an example of a second conversion process unit. The memory 20D stores the program and data required for the center 20 to execute various processes, and data including position information resulting from such processes.

A world-wide datum is a datum of which the scope of application can cover the entire globe. A local datum is a datum of which the scope of application does not cover the entire globe but can cover only some countries, regions, etc. included in the globe (regional datum).

The in-vehicle system 100 has a data communication module (DCM) 110, a navigation electronic control unit (ECU) 120, an ECU 130, and a CAN 140. The DCM 110, the navigation ECU 120, and the ECU 130 are connected to one another through the CAN 140. The ECU 130 collectively represents other ECUs than the DCM 110 and the navigation ECU 120 installed in the vehicle 50.

The DCM 110 has a communication unit 111, a communication ECU 112, a GPS reception unit 113, and a memory 114.

The communication unit 111 is an example of a communication unit or a wireless communication device installed in the vehicle 50, and performs wireless data communication with the center 20 through the communication network 11.

The communication ECU 112 has a control unit 112A. The communication ECU 112 is realized by a computer including a CPU, RAM, ROM, HDD, input-output interface, communication interface, internal bus, etc. The control unit 112A of the communication ECU 112 is an example of a first control unit.

The communication ECU 112 is connected to the navigation ECU 120 through the CAN 140. An airbag sensor 51 and an auto alarm sensor 52 are connected to the communication ECU 112.

The airbag sensor 51 detects that an airbag of the vehicle 50 has deployed, and outputs a signal indicating the deployment to the communication ECU 112. When a security device of the vehicle 50 issues an alarm, the auto alarm sensor 52 outputs a signal indicating the issuance of the alarm to the communication ECU 112.

The control unit 112A is represented as a functional block showing the function of a program executed by the communication ECU 112. The control unit 112A controls start, end, etc. of communication of the communication unit 111, input and output of data transmitted or received in wireless data communication, etc.

The control unit 112A outputs position information input from the GPS reception unit 113 to the navigation ECU 120 and also transmits the position information to the center 20.

Thus, when the airbag sensor 51 detects that an airbag has deployed or when the auto alarm sensor 52 detects that an alarm has been issued, the control unit 112A outputs the position information input from the GPS reception unit 113, along with information indicating the deployment of the airbag or the issuance of the alarm, to the center 20. As a result, the center 20 starts the emergency report service or the theft notification and tracking service.

There can be other cases than these cases where the control unit 112A transmits position information to the center 20. Also in such cases, position information is transmitted to the center 20 without having the datum converted. In some cases, the control unit 112A transmits information other than position information to the center 20. For example, when the vehicle 50 is an EV, PHV, HV, or the like, the control unit 112A may transmit a charging rate of a battery that stores electric power for running the vehicle 50, etc.

The GPS reception unit 113 receives position information and time information from the GPS. The datum of position information output by the GPS reception unit 113 is a world-wide datum. The GPS reception unit 113 is an example of a position information reception unit. The position information from the GPS received by the GPS reception unit 113 indicates the current position of the vehicle 50 by latitude and longitude. The time information is data indicating current time. The GPS reception unit 113 outputs the position information and the time information to the communication ECU 112.

The GPS reception unit 113 is the only GPS reception unit that is included in the in-vehicle system 100. In other words, the in-vehicle system 100 includes only one GPS reception unit. As mentioned above, the datum of position information received by the GPS reception unit 113 is a world-wide datum.

The memory 114 temporarily holds data transmitted or received by the communication ECU 112 through the communication unit 111, position information received by the GPS reception unit 113, etc., and stores a program etc. required for the DCM 110 to perform a communication process.

The navigation ECU 120 includes a main control unit 121, a position information acquisition unit 122, a conversion process unit 123, a route search unit 124, and a memory 125. The navigation ECU 120 is realized by a computer including a CPU, RAM, ROM, HDD, input-output interface, communication interface, internal bus, etc. The navigation ECU 120 is an example of a second control unit.

The main control unit 121, the position information acquisition unit 122, the conversion process unit 123, and the route search unit 124 are represented as functional blocks showing the functions of a program executed by the navigation ECU 120. The memory 125 represents the functions of parts that store data, such as the RAM, ROM, and HDD, included in the navigation ECU 120.

The main control unit 121 is a process unit that executes other processes than processes performed by the position information acquisition unit 122, the conversion process unit 123, and the route search unit 124, and that exercises overall control over the processes at the navigation ECU 120.

The position information acquisition unit 122 acquires, through the CAN 140, position information received by the GPS reception unit 113 of the DCM 110. The position information acquisition unit 122 also acquires, through the CAN 140, time information received by the GPS reception unit 113 of the DCM 110 along with the position information. Since the navigation ECU 120 does not include a GPS reception unit, the navigation ECU 120 acquires position information and time information from the DCM 110.

The conversion process unit 123 converts the datum of the position information acquired by the position information acquisition unit 122 from the DCM 110 from a world-wide datum into a local datum, and then outputs this position information to the main control unit 121 and the route search unit 124. As a result, the main control unit 121 shows the position information with the datum converted by the conversion process unit 123 as the current position on a map image shown on a display of a navigation device. The route search unit 124 searches for a route using the position information with the datum converted by the conversion process unit 123 as the current position. The conversion process unit 123 is an example of a first conversion process unit.

The route search unit 124 receives information including a destination input into a navigation system by a user of the vehicle 50, and performs a process of searching for a route based on the information including the destination and the position information indicating the current position of the vehicle 50. The route (from the current location to the destination) resulting from the search is shown on the display of the navigation device.

While in the embodiment described here the navigation ECU 120 performs a route search, the center 20 may instead perform a route search. In this case, the route search unit 124 may transmit information including a destination and position information indicating a current position of the vehicle 50 to the center 20 through the DCM 110, and the center 20 may search for a route and transmit data indicating a route resulting from the search to the in-vehicle system 100. The DCM 110 of the in-vehicle system 100 may receive the data indicating the route from the center 20 and transmit this data to the navigation ECU 120 through the CAN 140.

In this case, the DCM 110 may transmit the position information indicating the current position with the datum not converted to the center 20, and the center 20 may perform a route search by converting the datum of the received position information into a local datum.

The memory 125 stores map data, and programs, data, etc. required for control performed as the navigation ECU 120. The memory 125 is an example of a storage unit.

Figure 4:
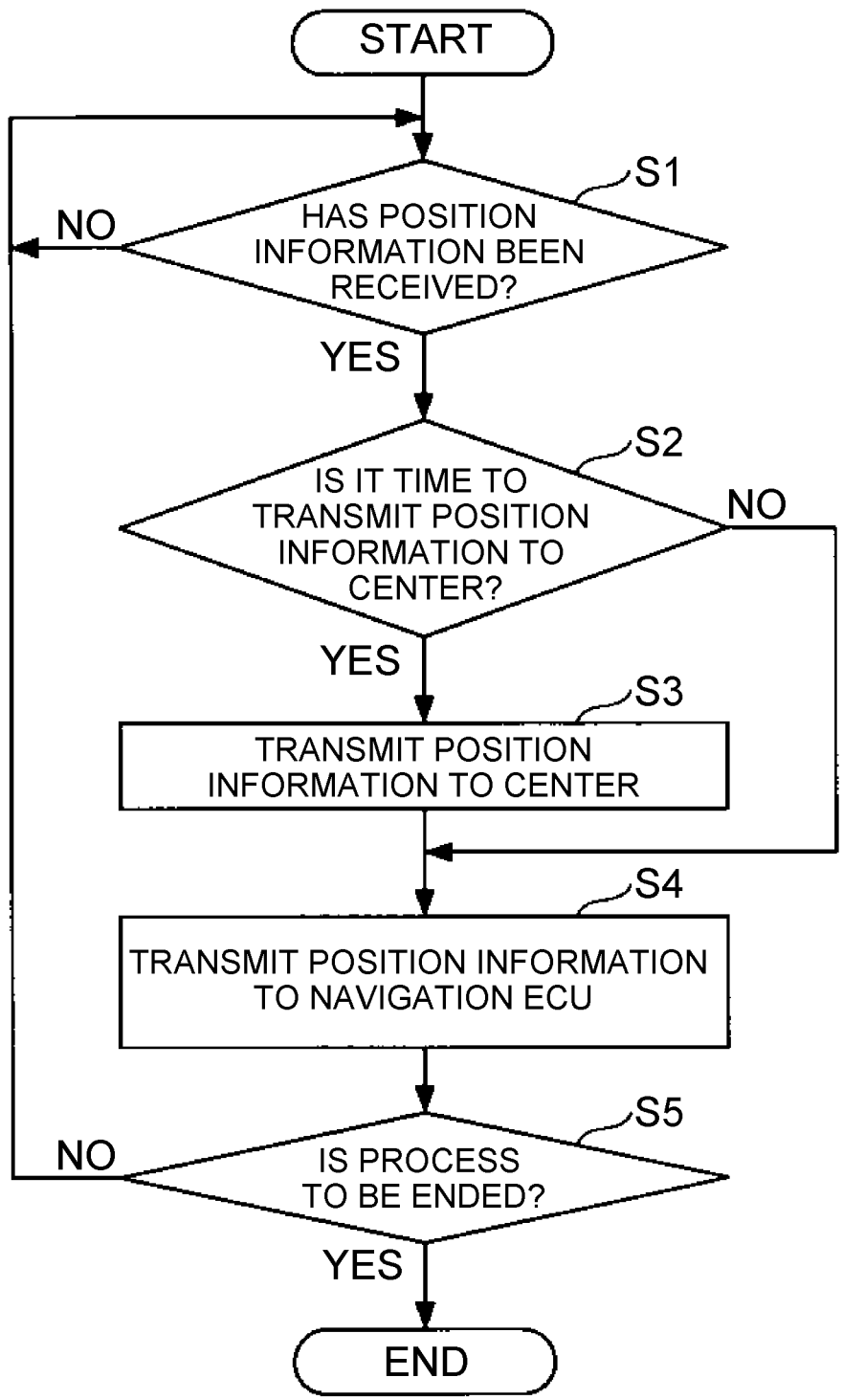
FIG. 4 is a flowchart showing a process executed by a communication ECU 112 of a DCM 110.

FIG. 4 is a flowchart showing a process executed by the communication ECU 112 of the DCM 110. More specifically, the process shown in FIG. 4 is a process executed by the control unit 112A of the communication ECU 112.

The communication ECU 112 starts the process when the ignition or the power of the vehicle 50 is turned on.

The communication ECU 112 determines whether position information has been received from the GPS reception unit 113 (step S1). The communication ECU 112 repeatedly executes the process in step S1 until determining that position information has been received.

When the communication ECU 112 determines that position information has been received (S1: YES), the communication ECU 112 determines whether it is time to transmit the position information to the center 20 (step S2). This is because position information is transmitted to the center 20 once every predetermined time. For example, the predetermined time is 30 seconds.

When the communication ECU 112 determines that it is time to transmit position information to the center 20 (S2: YES), the communication ECU 112 transmits the position information to the center 20 (step S3). As a result of the process in step S3, the position information based on a world-wide datum is transmitted to the center 20. After completing the process in step S3, the communication ECU 112 moves to step S4.

On the other hand, when the communication ECU 112 determines in step S2 that it is not time to transmit position information to the center 20 (S2: NO), the communication ECU 112 transmits the position information to the navigation ECU 120 (step S4).

When the process in step S4 is performed via step S3, the communication ECU 112 holds the position information received in step S1 in the memory 114, and transmits the position information to the center 20 in step S3, and then transmits the same position information to the navigation ECU 120 in step S4.

The communication ECU 112 determines whether or not to end the process (step S5). The process is ended when the ignition or the power is turned off.

When the communication ECU 112 determines not to end the process (S5: NO), the communication ECU 112 returns to step S1. Thus, the communication ECU 112 repeatedly executes the series of processes from step S1.

When the communication ECU 112 determines to end the process (S5: YES), the communication ECU 112 ends the process (END). Thus, the series of processes are ended.

Alternatively, the communication ECU 112 may determine whether the power of the navigation device is on before transmitting the position information to the navigation ECU 120 in step S4, and may transmit the position information to the navigation ECU 120 when the power of the navigation device is on.

Figure 5:
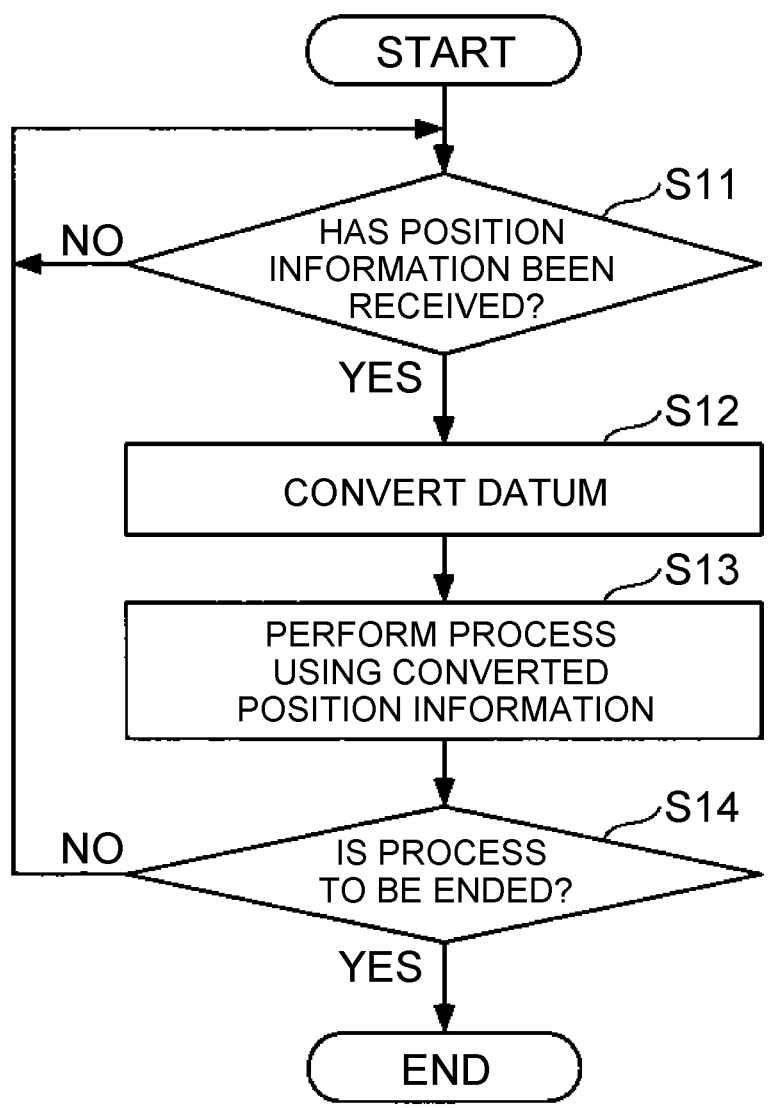
FIG. 5 is a flowchart showing a process executed by a navigation ECU 120.

FIG. 5 is a flowchart showing a process executed by the navigation ECU 120.

The navigation ECU 120 starts the process when the power of the navigation device is turned on.

The navigation ECU 120 determines whether position information has been received from the DCM 110 (step S11). The navigation ECU 120 repeatedly executes the process in step S11 until determining that position information has been received. The process in step S11 is performed by the position information acquisition unit 122.

When the navigation ECU 120 determines that position information has been received from the DCM 110 (S11: YES), the navigation ECU 120 converts the datum of the received position information from a world-wide datum into a local datum (step S12). The process in step S12 is performed by the conversion process unit 123.

The navigation ECU 120 performs a process using the converted position information (step S13). The process performed in step S13 is a control process performed as the navigation device. Examples of this process include a process of showing the current position on the display of the navigation device, a process of searching for a route using the current position, and a process of providing route guidance along a route resulting from the search.

The navigation ECU 120 determines whether or not to end the process (step S14). The process is ended when the power of the navigation device is turned off.

When the navigation ECU 120 determines to end the process (S14: YES), the navigation ECU 120 ends the process (END). Thus, the series of processes are ended. When the navigation ECU 120 determines not to end the process (S14: NO), the navigation ECU 120 returns to step S11 (END).

As has been described above, the navigation ECU 120 of the in-vehicle system 100 of the embodiment has the conversion process unit 123, so that the datum of position information received by the GPS reception unit 113 from a GPS satellite can be converted inside the in-vehicle system 100. Since the datum of position information received from a GPS satellite is a world-wide datum, this position information is converted into position information based on a local datum by the conversion process unit 123.

Since the conversion process unit 123 converts position information based on a world-wide datum received by the DCM 110 from a GPS satellite into position information based on a local datum that is used by the navigation ECU 120, the navigation ECU 120 can perform a route search by converting the datum of the position information received from the DCM 110 through the CAN 140.

Thus, the in-vehicle system 100 has the configuration that does not include any other GPS reception unit than the GPS reception unit 113 included in the DCM 110, and yet the navigation ECU 120 can perform a route search by using position information based on the local datum of the country, region, etc. where the vehicle 50 is located.

Compared with a configuration in which the in-vehicle system 100 includes another GPS reception unit than the GPS reception unit 113 and the navigation ECU 120 includes this other GPS reception unit or is connected to this other GPS reception unit, the configuration of the in-vehicle system 100 of the embodiment that includes only one GPS reception unit 113 can realize a simple configuration. Having a GPS antenna etc., the GPS reception unit 113 requires some space for installation. Thus, the in-vehicle system 100 of the embodiment can achieve downsizing. Moreover, the in-vehicle system 100 of the embodiment can achieve cost reduction by realizing a simple configuration.

Specifically, the in-vehicle system 100 of the embodiment can convert the datum of position information while having the configuration that includes the only one GPS reception unit 113. Thus configured, the in-vehicle system 100 realizes simplification of the configuration, downsizing, and cost reduction.

The only conversion process unit that is included in the in-vehicle system 100 of the embodiment is the conversion process unit 123 of the navigation ECU 120. This also contributes to simplification of the contribution and cost reduction of the in-vehicle system 100 of the embodiment.

In the embodiment described above, the DCM 110 includes the GPS reception unit 113. However, the GPS reception unit 113 may instead be provided outside the DCM 110 and the GPS reception unit 113 may be connected to the DCM 110.

In the embodiment described above, the DCM 110 transmits position information with the datum not converted to the center 20, and the conversion process unit 20C of the center 20 converts the datum of the received position information. However, when the local datum used by the navigation ECU 120 and the local datum into which the datum of position information is converted at the center 20 are the same, the navigation ECU 120 may transmit position information with the datum converted into the local datum to the DCM 110, and the DCM 110 may transmit this position information based on the local datum to the center 20. In this case, the center 20 need not include the conversion process unit 20C.

In the embodiment described above, the DCM 110 including the communication unit 111 includes the GPS reception unit 113. However, the in-vehicle system 100 may not include the DCM 110, and one ECU of the ECU 130 may include the GPS reception unit 113 or is connected to the GPS reception unit 113. In this case, the in-vehicle system 100 does not perform communication with the center 20 and other external devices through the communication network 11, and position information is transmitted from that one of the ECU 130 having the GPS reception unit 113 to the navigation ECU 120.

In the embodiment described above, the DCM 110 and the navigation ECU 120 are connected to each other through the CAN 140. However, the DCM 110 and the navigation ECU 120 may instead be connected to each other through a bus etc. other than the CAN 140, such as a universal serial bus (USB). When the DCM 110 and the navigation ECU 120 use a communication protocol of Ethernet®, the DCM 110 and the navigation ECU 120 may be connected to each other through a communication cable of Ethernet.

In the embodiment described above, the in-vehicle system 100 includes the navigation ECU 120. However, the in-vehicle system 100 may include an ECU that uses position information instead of the navigation ECU 120. Examples of the ECU that uses position information include an ECU that controls automatic driving (automatic driving ECU).

This applies to a case where the vehicle 50 is an automatic driving vehicle. In this case, the ECU that uses position information may have a conversion process unit, and the datum of position information transmitted from the DCM 110 through the CAN 140 may be converted by the conversion process unit into a datum used by the automatic driving ECU (e.g., a local datum). Automatic driving is automatic driving of a predetermined level specified by the Ministry of Land, Infrastructure, Transport and Tourism, the Society of Automotive Engineers (SAE), etc.

When the in-vehicle system 100 includes the automatic driving ECU in addition to the navigation ECU 120 or in place of the navigation ECU 120, the automatic driving ECU may not have a GPS reception unit and may acquire position information from the DCM 110. This is because the in-vehicle system 100 does not include any other GPS reception unit than the GPS reception unit 113.

Alternatively, in this case, the DCM 110 may not include the GPS reception unit 113 and the automatic driving ECU may include a GPS reception unit, and the DCM 110 and the navigation ECU 120 may acquire position information from the automatic driving ECU.

When the in-vehicle system 100 includes an inter-vehicle communication ECU that performs data communication between vehicles, in addition to the navigation ECU 120 or in place of the navigation ECU 120, the inter-vehicle communication ECU may not have a GPS reception unit and may acquire position information from the DCM 110. This is because the in-vehicle system 100 does not include any other GPS reception unit than the GPS reception unit 113.

Alternatively, in this case, the DCM 110 may not include the GPS reception unit 113 and the inter-vehicle communication ECU may include a GPS reception unit, and the DCM 110 and the navigation ECU 120 may acquire position information from the inter-vehicle communication ECU. The in-vehicle system 100 may also include both the automatic driving ECU and the inter-vehicle communication ECU, as long as the in-vehicle system 100 has a configuration that includes only one GPS reception unit.

In the embodiment described above, the DCM 110 has the GPS reception unit 113 and the navigation ECU 120 has the conversion process unit 123. However, the DCM 110 may not include the GPS reception unit 113 and the navigation ECU 120 may have a GPS reception unit. In other words, the navigation ECU 120 may have a GPS reception unit and thus the in-vehicle system 100 may include the only one GPS reception unit. In this case, position information with the datum not converted may be transmitted from the GPS reception unit of the navigation ECU 120 to the DCM 110, and the DCM 110 may transmit the received position information to the center 20.

In the embodiment described above, the navigation ECU 120 has the conversion process unit 123. However, the navigation ECU 120 may not have the conversion process unit 123 and the DCM 110 may have a conversion process unit. This will be described using FIG. 6 and FIG. 7.

First Modified Example

Figure 6:
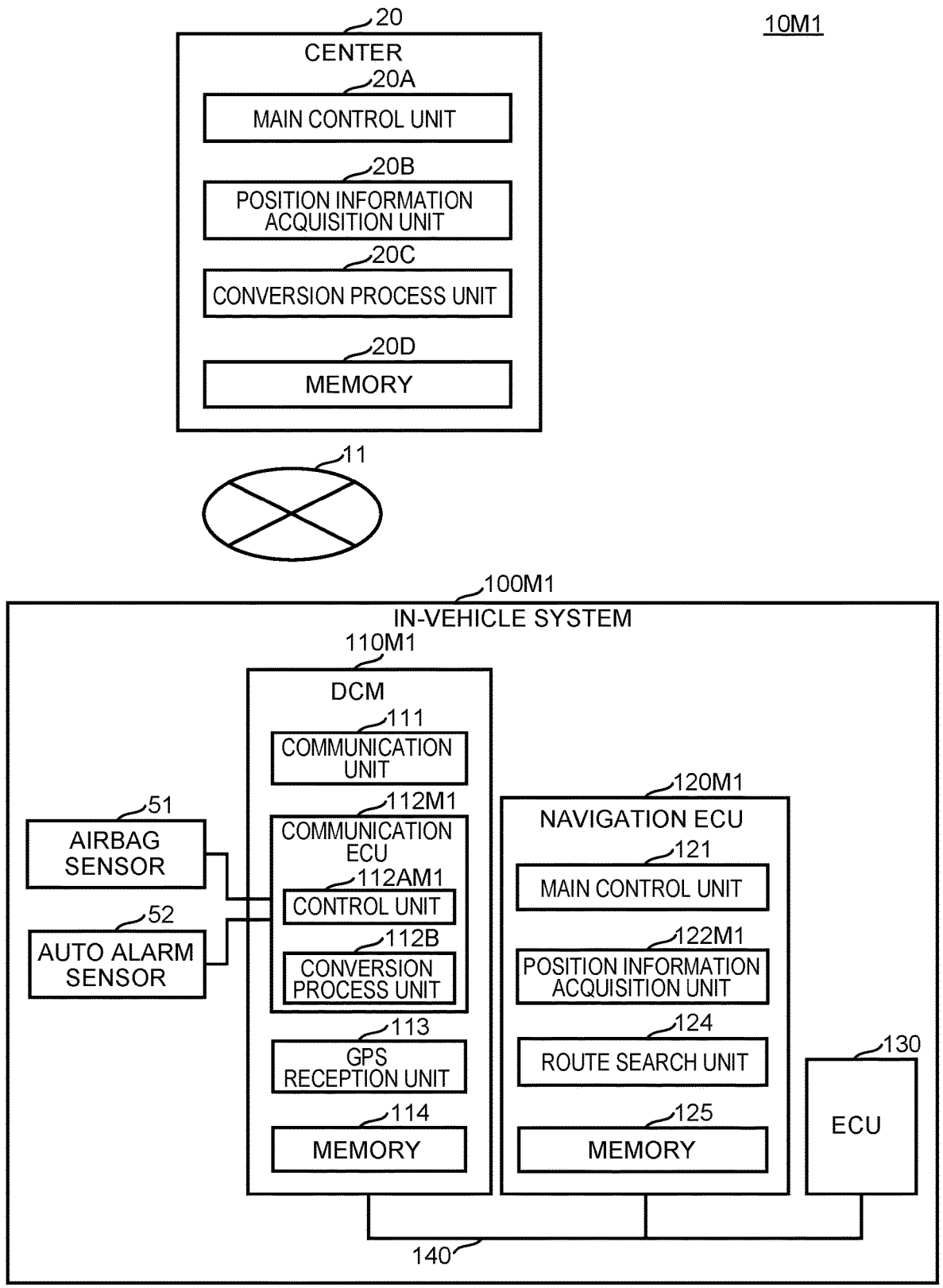
FIG. 6 is a view showing the internal configurations of the center 20 and an in-vehicle system 100M1 of a data communication system 10M1 according to a modified example of the embodiment.

FIG. 6 is a view showing the internal configurations of the center 20 and an in-vehicle system 100M1 of a data communication system 10M1 according to a modified example of the embodiment. Those components of FIG. 6 that are the same as the components shown in FIG. 3 are denoted by the same reference signs and will not be described.

The data communication system 10M1 includes the center 20 and the in-vehicle system 100M1.

The in-vehicle system 100M1 has a DCM 110M1, a navigation ECU 120M1, the ECU 130, and the CAN 140. The DCM 110M1, the navigation ECU 120M1, and the ECU 130 are connected to one another through the CAN 140.

The DCM 110M1 has the communication unit 111, a communication ECU 112M1, the GPS reception unit 113, and the memory 114.

The communication ECU 112M1 has a control unit 112AM1 and a conversion process unit 112B. The control unit 112AM1 and the conversion process unit 112B are represented as functional blocks showing the functions of a program executed by the communication ECU 112M1.

The conversion process unit 112B converts the datum (world-wide datum) of position information input from the GPS reception unit 113 into a local datum, and outputs this position information. The conversion process unit 112B is an example of the first conversion process unit.

When the control unit 112AM1 outputs position information input from the GPS reception unit 113 to the navigation ECU 120M1, the control unit 112AM1 converts the datum of the position information input from the GPS reception unit 113 from a world-wide datum into a local datum by the conversion process unit 112B before outputting the position information to the navigation ECU 120M1. The control unit 112AM1 is an example of the first control unit.

When the control unit 112AM1 outputs position information input from the GPS reception unit 113 to the center 20, the control unit 112AM1 outputs the position information input from the GPS reception unit 113 to the center 20 without converting the datum by the conversion process unit 112B.

The navigation ECU 120M1 includes the main control unit 121, a position information acquisition unit 122M1, the route search unit 124, and the memory 125. The navigation ECU 120M1 has a configuration obtained by replacing the position information acquisition unit 122 of the navigation ECU 120 shown in FIG. 3 with the position information acquisition unit 122M1 and removing the conversion process unit 123 from the navigation ECU 120.

The position information acquisition unit 122M1 acquires, through the CAN 140, position information which has been received by the GPS reception unit 113 of the DCM 110M1 and of which the datum has been converted from a world-wide datum into a local datum by the conversion process unit 112B of the communication ECU 112M1.

Figure 7:
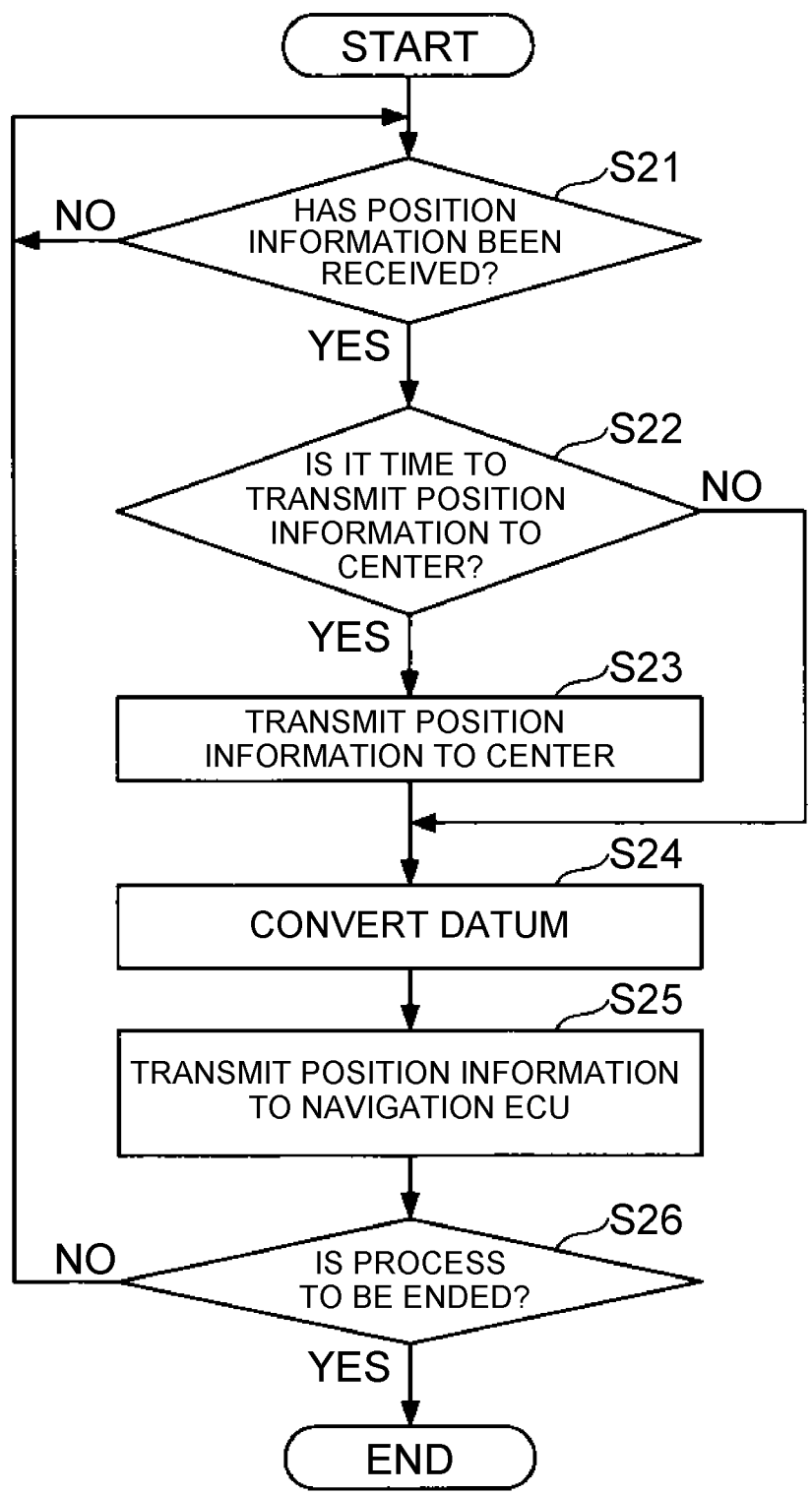
FIG. 7 is a flowchart showing a process executed by a communication ECU 112M1 of a DCM 110M1.

FIG. 7 is a flowchart showing a process executed by the communication ECU 112M1 of the DCM 110M1. The process from start to step S23 is the same as the process from start to step S3 shown in FIG. 4.

When the communication ECU 112M1 determines that it is time to transmit position information to the center 20 (S22: YES), the communication ECU 112M1 transmits the position information to the center 20 without converting the datum (step S23). After completing the process in step S23, the communication ECU 112M1 moves to step S24.

On the other hand, when the communication ECU 112M1 determines in step S22 that it is not time to transmit position information to the center 20 (S22: NO), the communication ECU 112M1 converts the datum of the position information received from the GPS reception unit 113 from a world-wide datum into a local datum (step S24). This is to convert the datum into a datum that is used by the navigation ECU 120M1.

The communication ECU 112M1 transmits the position information with the datum converted into the local datum to the navigation ECU 120M1 (step S25).

The communication ECU 112M1 determines whether or not to end the process (step S26). The process is ended when the ignition or the power is turned off.

When the communication ECU 112M1 determines not to end the process (S26: NO), the communication ECU 112M1 returns to step S21. Thus, the communication ECU 112M1 repeatedly executes the series of processes from step S21.

When the communication ECU 112M1 determines to end the process (S26: YES), the communication ECU 112M1 ends the process (END). Thus, the series of processes are ended.

As has been described above, the communication ECU 112M1 of the DCM 110M1 of the in-vehicle system 100M1 of this modified example of the embodiment has the conversion process unit 112B, so that the datum of position information received by the GPS reception unit 113 from a GPS satellite can be converted inside the in-vehicle system 100M1. Since the datum of position information received from a GPS satellite is a world-wide datum, this position information is converted into position information based on a local datum by the conversion process unit 112B.

Since the conversion process unit 112B converts position information based on a world-wide datum received from a GPS satellite into position information based on the local datum that is used by the navigation ECU 120M1, the navigation ECU 120M1 can perform a route search by using the position information received from the DCM 110M1 through the CAN 140.

Thus, the in-vehicle system 100M1 has the configuration that does not include any other GPS reception unit than the GPS reception unit 113 included in the DCM 110M1, and yet the navigation ECU 120M1 can perform a route search by using position information based on the local datum of the country, region, etc. where the vehicle 50 is located.

The in-vehicle system 100M1 of this modified example includes the only one GPS reception unit 113 and can thereby realize a simple configuration. Having a GPS antenna etc., the GPS reception unit 113 requires some space for installation. Thus, the in-vehicle system 100M1 of the modified example can achieve downsizing. Moreover, the in-vehicle system 100M1 of the modified example can achieve cost reduction by realizing a simple configuration.

Specifically, the in-vehicle system 100M1 of this modified example can convert the datum of position information while having the configuration that includes the only one GPS reception unit 113. Thus configured, the in-vehicle system 100M1 realizes simplification of the configuration, downsizing, and cost reduction.

In the modified example described using FIG. 6, the DCM 110M1 transmits position information with the datum not converted by the conversion process unit 112B to the center 20. However, the DCM 110M1 may instead transmit position information with the datum converted by the conversion process unit 112B to the center 20. In this case, the center 20 need not include the conversion process unit 20C.

In the embodiment described using FIG. 3, the DCM 110 includes the GPS reception unit 113. However, the navigation ECU 120 may include a GPS reception unit and the DCM 110 may not include the GPS reception unit 113. This example will be described using FIG. 8 and FIG. 9.

Second Modified Example

Figure 8:
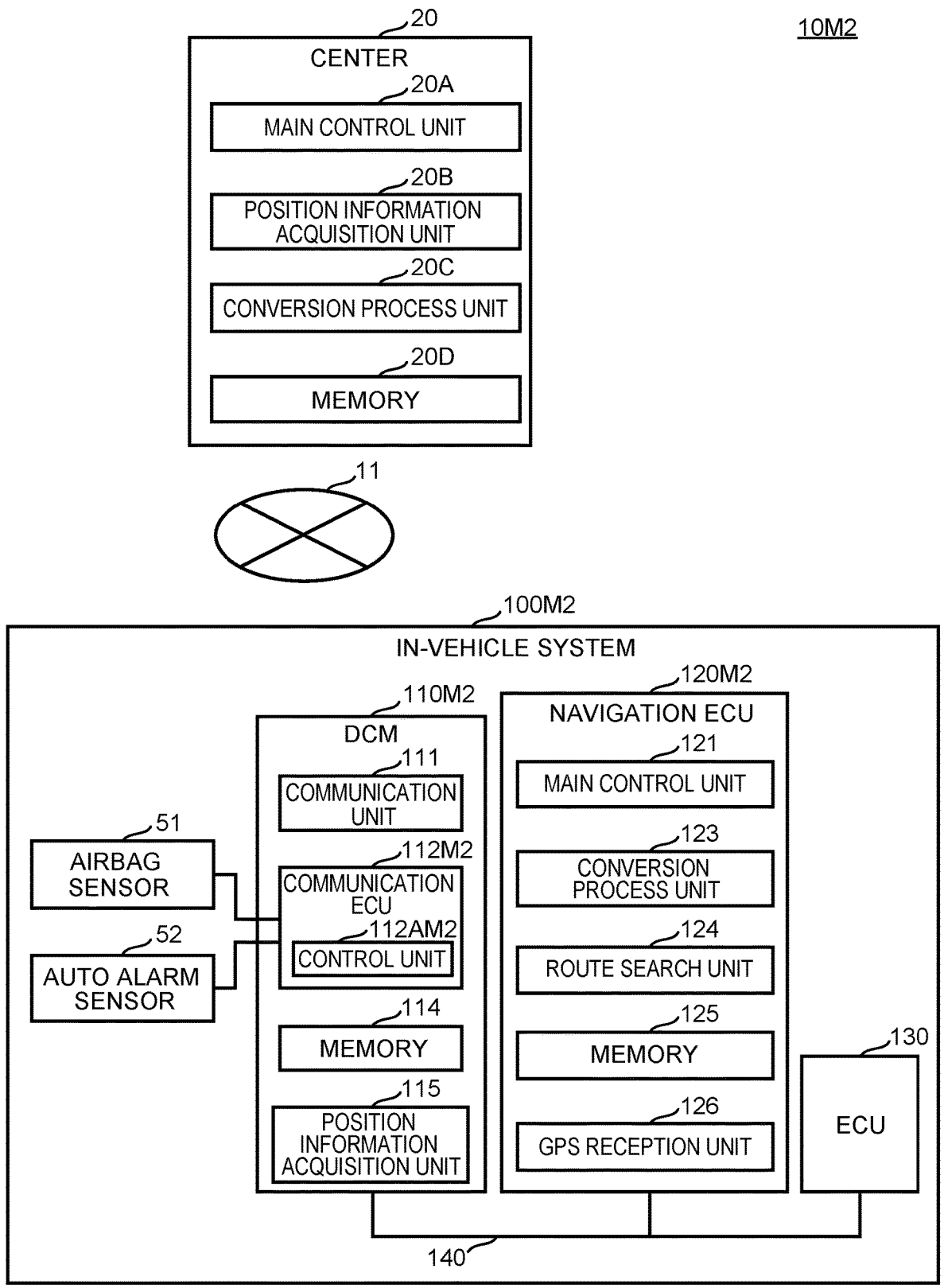
FIG. 8 is a view showing the internal configurations of the center 20 and an in-vehicle system 100M2 of a data communication system 10M2 according to a modified example of the embodiment.

FIG. 8 is a view showing the internal configurations of the center 20 and an in-vehicle system 100M2 of a data communication system 10M2 according to a modified example of the embodiment. Those components of FIG. 8 that are the same as the components shown in FIG. 3 are denoted by the same reference signs and will not be described.

The data communication system 10M2 includes the center 20 and the in-vehicle system 100M2.

The in-vehicle system 100M2 has a DCM 110M2, a navigation ECU 120M2, the ECU 130, and the CAN 140. The DCM 110M2, the navigation ECU 120M2, and the ECU 130 are connected to one another through the CAN 140.

The DCM 110M2 has the communication unit 111, a communication ECU 112M2, the memory 114, and a position information acquisition unit 115.

The communication ECU 112M2 has a control unit 112AM2. The control unit 112AM2 is represented as a functional block showing the function of a program executed by the communication ECU 112M2.

The control unit 112AM2 outputs position information input from the navigation ECU 120M2 to the center 20. In the configuration of FIG. 8, the control unit 112AM2 is an example of the second control unit.

The navigation ECU 120M2 includes the main control unit 121, the conversion process unit 123, the route search unit 124, the memory 125, and a GPS reception unit 126. The navigation ECU 120M2 has a configuration obtained by removing the position information acquisition unit 122 from the navigation ECU 120 shown in FIG. 3 and adding the GPS reception unit 126 to the navigation ECU 120. In the configuration of FIG. 8, the navigation ECU 120M2 is an example of the first control unit.

The conversion process unit 123 converts the datum of position information received by the GPS reception unit 126, and transmits this position information to the main control unit 121 and the route search unit 124. Since the datum of position information received by the GPS reception unit 126 is a world-wide datum, the conversion process unit 123 converts the datum of the position information to be used inside the navigation ECU 120M2 into a local datum. However, the GPS reception unit 126 does not convert the datum of position information transmitted from the navigation ECU 120M2 to the DCM 110M2. Thus, position information based on a world-wide datum is transmitted from the navigation ECU 120M2 to the DCM 110M2.

Figure 9:
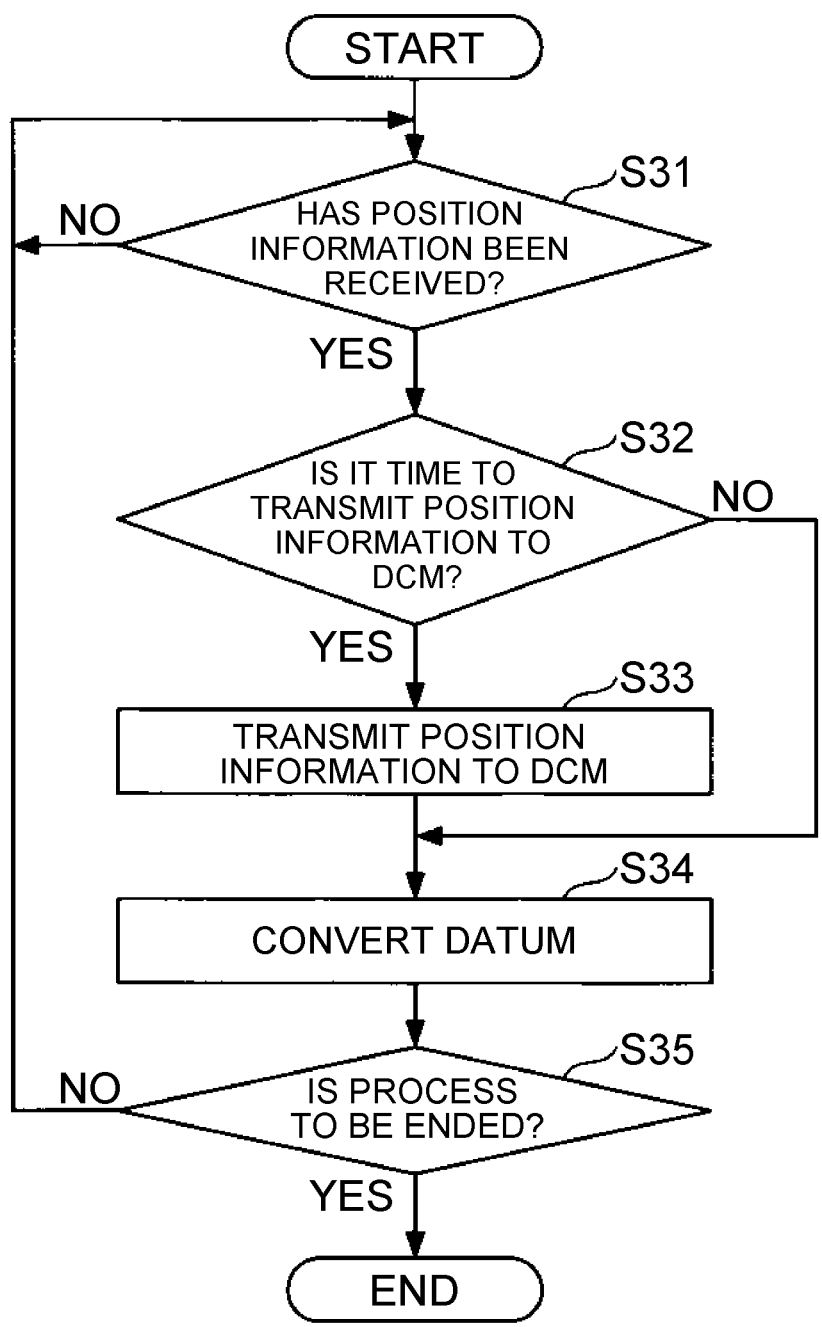
FIG. 9 is a flowchart showing a process executed by a navigation ECU 120M2.

FIG. 9 is a flowchart showing a process executed by the navigation ECU 120M2.

The navigation ECU 120M2 starts the process when the ignition or the power of the vehicle 50 is turned on.

The navigation ECU 120M2 determines whether position information has been received from the GPS reception unit 126 (step S31). The navigation ECU 120M2 repeatedly executes the process in step S31 until determining that position information has been received.

When the navigation ECU 120M2 determines that position information has been received (S31: YES), the navigation ECU 120M2 determines whether it is time to transmit position information to the DCM 110M2 (step S32). This is because the DCM 110M2 transmits position information to the center 20 once every predetermined time. For example, the predetermined time is 30 seconds.

When the navigation ECU 120M2 determines that it is time to transmit position information to the DCM 110M2 (S32: YES), the navigation ECU 120M2 transmits the position information to the DCM 110M2 without converting the datum (step S33). After completing the process in step S33, the navigation ECU 120M2 moves to step S34.

On the other hand, when the navigation ECU 120M2 determines in step S32 that it is not time to transmit position information to the DCM 110M2 (S32: NO), the navigation ECU 120M2 converts the datum of the position information received by the GPS reception unit 126 from a world-wide datum into a local datum (step S34). This is to convert the datum into a datum that is used inside the navigation ECU 120M2. The position information with the datum converted into the local datum is used by the main control unit 121 and the route search unit 124. For example, the main control unit 121 shows the current position on the display of the navigation device, and the route search unit 124 provides route guidance or performs a route search, by using the position information based on the local datum.

The navigation ECU 120M2 determines whether or not to end the process (step S35). The process is ended when the ignition or the power is turned off.

When the navigation ECU 120M2 determines not to end the process (S35: NO), the navigation ECU 120M2 returns to step S31. Thus, the navigation ECU 120M2 repeatedly executes the series of processes from step S31.

When the navigation ECU 120M2 determines to end the process (S35: YES), the navigation ECU 120M2 ends the process (END). Thus, the series of processes are ended.

As has been described above, the navigation ECU 120M2 of the in-vehicle system 100M2 of this modified example of the embodiment has the conversion process unit 123 and the GPS reception unit 126, so that the datum of position information received by the GPS reception unit 126 from a GPS satellite can be converted inside the in-vehicle system 100M2. Since the datum of position information received from a GPS satellite is a world-wide datum, this position information is converted by the conversion process unit 123 into position information based on the local datum that is used inside the navigation ECU 120M2.

Therefore, the navigation ECU 120M2 can perform a route search by using position information which has been received by the GPS reception unit 126 and of which the datum has been converted into the local datum by the conversion process unit 123.

Thus, the in-vehicle system 100M2 has the configuration that does not include any other GPS reception unit than the GPS reception unit 126 included in the navigation ECU 120M2, and yet the navigation ECU 120M2 can perform a route search by using position information based on the local datum of the country, region, etc. where the vehicle 50 is located.

Since the navigation ECU 120M2 transmits position information with the datum not converted to the DCM 110M2, the DCM 110M2 can transmit position information based on a world-wide datum to the center 20.

The in-vehicle system 100M2 of this modified example of the embodiment can convert the datum of position information while having the configuration that includes the only one GPS reception unit 126. Thus configured, the in-vehicle system 100M2 realizes simplification of the configuration, downsizing, and cost reduction.

In the modified example described here, the navigation ECU 120M2 transmits position information with the datum not converted to the DCM 110M2, and the DCM 110M2 transmits position information based on a world-wide datum to the center 20. However, when the local datum used by the navigation ECU 120M2 and the local datum into which the datum of position information is converted at the center 20 are the same, the navigation ECU 120M2 may transmit position information with the datum converted into the local datum to the DCM 110M2 and the DCM 110M2 may transmit the position information based on the local datum to the center 20.

In the embodiment described using FIG. 3, the DCM 110 includes the GPS reception unit 113 and the navigation ECU 120 includes the conversion process unit 123. However, the DCM 110 may not include the GPS reception unit 113 and the navigation ECU 120 may not include the conversion process unit 123, and the in-vehicle system 100 may include, separately from the DCM 110 and the navigation ECU 120, an ECU that includes a GPS reception unit or is connected to a GPS reception unit. This example will be described using FIG. 10.

Third Modified Example

Figure 10:
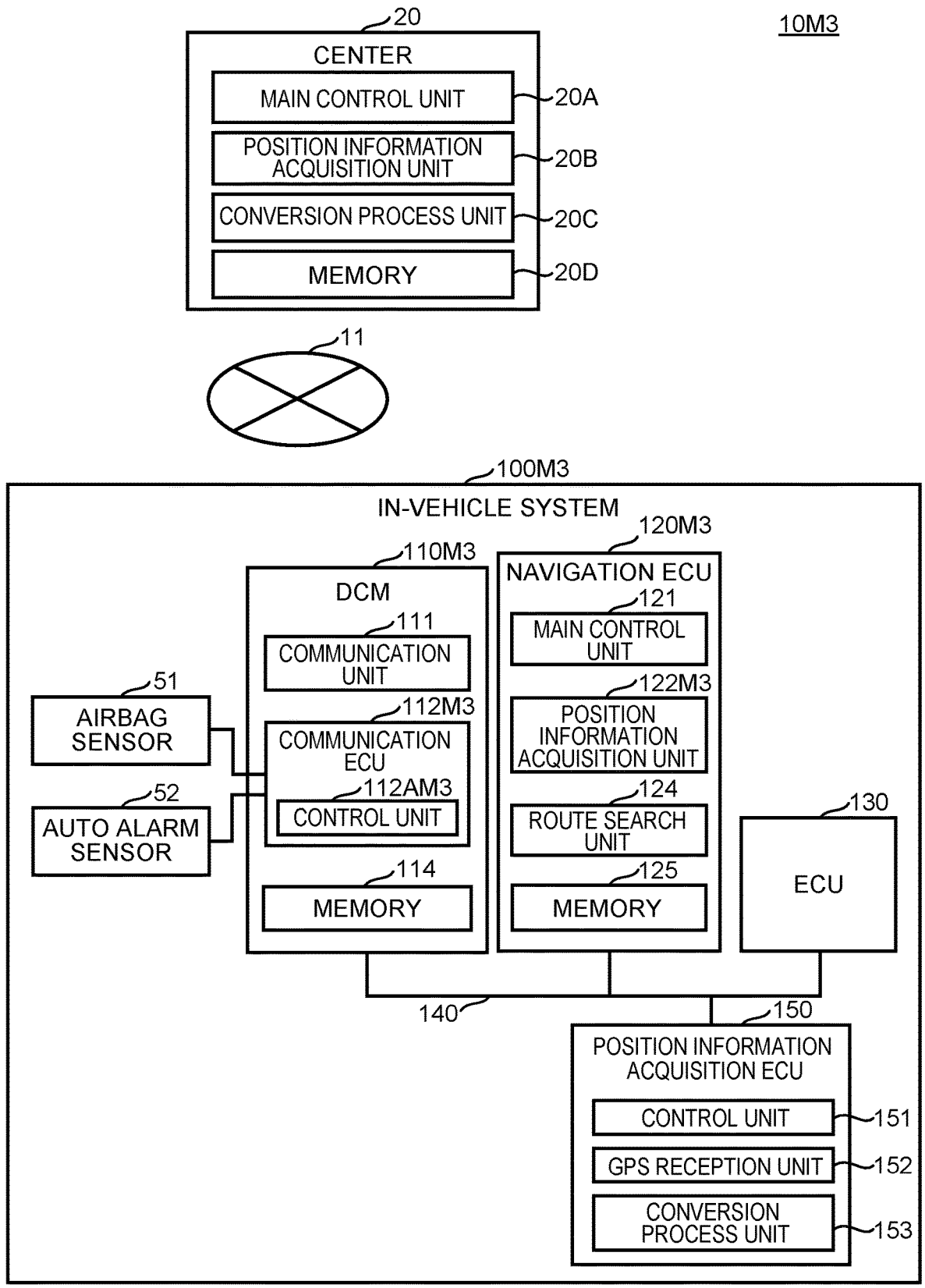
FIG. 10 is a view showing the internal configurations of the center 20 and an in-vehicle system 100M3 of a data communication system 10M3 according to a modified example of the embodiment.

FIG. 10 is a view showing the internal configurations of the center 20 and an in-vehicle system 100M3 of a data communication system 10M3 according to a modified example of the embodiment. Those components of FIG. 10 that are the same as the components shown in FIG. 3 are denoted by the same reference signs and will not be described.

The data communication system 10M3 includes the center 20 and the in-vehicle system 100M3.

The in-vehicle system 100M3 has a DCM 110M3, a navigation ECU 120M3, the ECU 130, the CAN 140, and a position information acquisition ECU 150. The DCM 110M3, the navigation ECU 120M3, the ECU 130, and the position information acquisition ECU 150 are connected to one another through the CAN 140. In the configuration of FIG. 10, the position information acquisition ECU 150 is an example of the first control unit.

The DCM 110M3 has the communication unit 111, a communication ECU 112M3, and the memory 114. The DCM 110M3 has a configuration obtained by removing the GPS reception unit 113 from the DCM 110 shown in FIG. 3.

The communication ECU 112M3 has a control unit 112AM3. The control unit 112AM3 is represented as a functional block showing the function of a program executed by the communication ECU 112M3. In the configuration of FIG. 8, the control unit 112AM3 or the navigation ECU 120M3 is an example of the second control unit.

The control unit 112AM3 controls start, end, etc. of communication of the communication unit 111, input and output of data transmitted or received in wireless data communication, etc. The control unit 112AM3 outputs position information input from the position information acquisition ECU 150 to the center 20.

The memory 114 temporarily holds data etc. transmitted or received by the communication ECU 112M3 through the communication unit 111, and stores a program etc. required for the DCM 110M3 to perform a communication process.

The navigation ECU 120M3 includes the main control unit 121, a position information acquisition unit 122M3, the route search unit 124, and the memory 125. The navigation ECU 120M3 is different from the navigation ECU 120M1 shown in FIG. 6 in that the position information acquisition unit 122M3 acquires position information from the position information acquisition ECU 150.

The position information acquisition ECU 150 has a control unit 151, a GPS reception unit 152, and a conversion process unit 153. The GPS reception unit 152 and the conversion process unit 153 are the same as the GPS reception unit 113 and the conversion process unit 112B, respectively, of the DCM 110M1 shown in FIG. 6.

As in the in-vehicle system 100M3 shown in FIG. 10, the GPS reception unit 152 of the position information acquisition ECU 150 provided separately from the DCM 110M3 and the navigation ECU 120M3 may acquire position information, and the control unit 151 may transmit this position information to the DCM 110M3 and the navigation ECU 120M3 through the CAN 140.

The conversion process unit 153 does not convert the datum of position information to be transmitted to the DCM 110M3, but converts the datum of position information to be transmitted to the navigation ECU 120M3.

The communication ECU 112M3 of the DCM 110M3 transmits the position information acquired from the position information acquisition ECU 150 to the center 20, and the navigation ECU 120M3 performs a route search etc. by using the position information acquired from the position information acquisition ECU 150.

Figure 11:
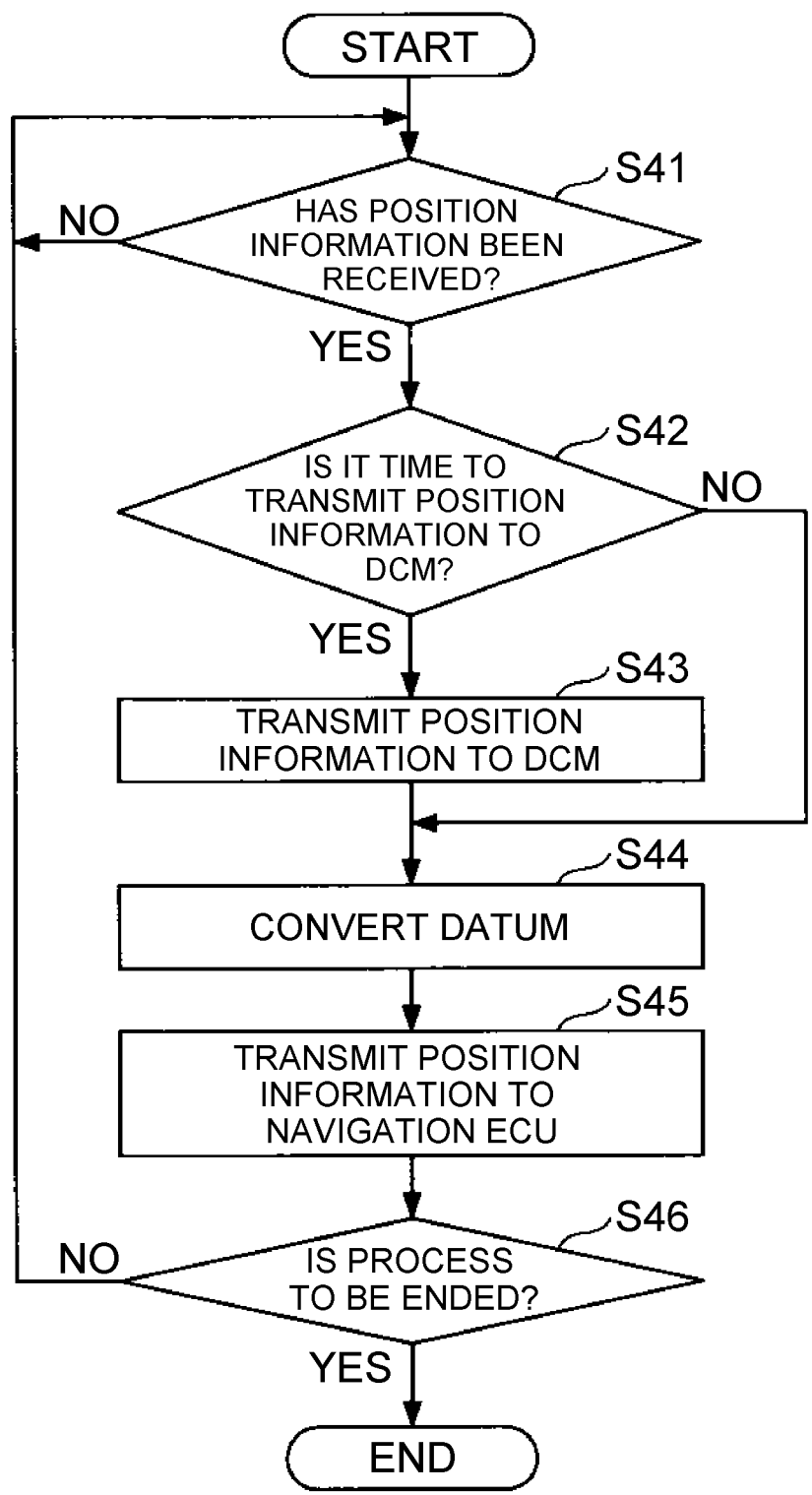
FIG. 11 is a flowchart showing a process executed by a position information acquisition ECU 150.

FIG. 11 is a flowchart showing a process executed by the position information acquisition ECU 150.

The position information acquisition ECU 150 starts the process when the ignition or the power of the vehicle 50 is turned on.

The position information acquisition ECU 150 determines whether the GPS reception unit 152 has received position information (step S41). The position information acquisition ECU 150 repeatedly executes the process in step S41 until determining that position information has been received.

When the position information acquisition ECU 150 determines that position information has been received (S41: YES), the position information acquisition ECU 150 determines whether it is time to transmit position information to the DCM 110M3 (step S42). This is because the DCM 110M3 transmits position information to the center 20 once every predetermined time. For example, the predetermined time is 30 seconds.

When the position information acquisition ECU 150 determines that it is time to transmit position information to the DCM 110M3 (S42: YES), the position information acquisition ECU 150 transmits the position information to the DCM 110M3 without converting the datum (step S43). After completing the process in step S43, the position information acquisition ECU 150 moves to step S44.

On the other hand, when the position information acquisition ECU 150 determines in step S42 that it is not time to transmit position information to the DCM 110M3 (S42: NO), the position information acquisition ECU 150 converts the datum of the position information received by the GPS reception unit 152 from a world-wide datum into a local datum (step S44). This is to convert the datum into a datum that is used by the navigation ECU 120M3.

The position information acquisition ECU 150 transmits the position information with the datum converted in step S44 to the navigation ECU 120M3 (step S45). Thus, the navigation ECU 120M3 can perform processes including showing the current position of the vehicle 50, providing route guidance, and performing a route search.

The position information acquisition ECU 150 determines whether or not to end the process (step S46). The process is ended when the ignition or the power is turned off.

When the position information acquisition ECU 150 determines not to end the process (S46: NO), the position information acquisition ECU 150 returns to step S41. Thus, the position information acquisition ECU 150 repeatedly executes the series of processes from step S41.

When the position information acquisition ECU 150 determines to end the process (S46: YES), the position information acquisition ECU 150 ends the process (END). Thus, the series of processes are ended.

As has been described above, the position information acquisition ECU 150, other than the DCM 110M3 and the navigation ECU 120M3, of the in-vehicle system 100M3 of this modified example of the embodiment has the GPS reception unit 152 and the conversion process unit 153, so that the datum of position information received by the GPS reception unit 152 from a GPS satellite can be converted inside the in-vehicle system 100M3. Since the datum of position information received from a GPS satellite is a world-wide datum, this position information is transmitted to the navigation ECU 120M3 after the datum is converted into a local datum by the conversion process unit 153.

Therefore, the navigation ECU 120M3 can perform a route search by using position information which has been received by the GPS reception unit 152 and of which the datum has been converted into a local datum by the conversion process unit 153.

Thus, the in-vehicle system 100M3 has the configuration that does not include any other GPS reception unit than the GPS reception unit 152 included in the position information acquisition ECU 150, and yet the navigation ECU 120M3 can perform a route search by using position information based on the local datum of the country, region, etc. where the vehicle 50 is located.

Since the position information acquisition ECU 150 transmits position information with the datum not converted to the DCM 110M3, the DCM 110M3 can transmit the position information based on a world-wide datum to the center 20.

The in-vehicle system 100M3 of this modified example of the embodiment can convert the datum of position information while having the configuration that includes the only one GPS reception unit 152. Thus configured, the in-vehicle system 100M3 realizes simplification of the configuration, downsizing, and cost reduction.

The following items 1 to 7 are disclosed: (Item 1) A data communication system including a server and an in-vehicle system that performs wireless data communication with the server. The in-vehicle system includes: a position information reception unit that receives position information from a satellite positioning system; a first control unit that includes the position information reception unit or is connected to the position information reception unit; a communication line connected to the first control unit; and a second control unit that is connected to the first control unit through the communication line and has a first conversion process unit that converts the datum of the position information. The first control unit transmits the position information received by the position information reception unit to the second control unit through the communication line, and the second control unit converts the datum of the position information received from the first control unit by the first conversion process unit. (Item 2) A data communication system including a server and an in-vehicle system that performs wireless data communication with the server. The in-vehicle system includes: a position information reception unit that receives position information from a satellite positioning system; a first control unit that includes the position information reception unit or is connected to the position information reception unit, and has a first conversion process unit that converts the datum of the position information; a communication line connected to the first control unit; and a second control unit connected to the first control unit through the communication line. The first control unit converts the datum of the position information received by the position information reception unit by the first conversion process unit, and transmits the position information with the datum converted to the second control unit through the communication line. (Item 3) The data communication system according to item 1 or 2, wherein: the in-vehicle system further includes a communication unit that communicates with the server; the first control unit includes the communication unit or is connected to the communication unit, and transmits position information with the datum not converted to the server through the communication unit; and the server includes a second conversion process unit that converts the datum of position information from the satellite positioning system, and converts the datum of the position information received from the first control unit by the second conversion process unit. (Item 4) The data communication system according to any one of items 1 to 3, wherein the data communication system does not include any position information reception unit that receives position information from the satellite positioning system, other than the position information reception unit. (Item 5) A control method of an in-vehicle system including: a position information reception unit that receives position information from a satellite positioning system; a first control unit that includes the position information reception unit or is connected to the position information reception unit; a communication line connected to the first control unit; and a second control unit that is connected to the first control unit through the communication line and has a first conversion process unit that converts the datum of the position information. The control method includes: transmitting the position information received by the position information reception unit from the first control unit to the second control unit through the communication line; and converting the datum of the position information received from the first control unit by the first conversion process unit of the second control unit. (Item 6) A control method of an in-vehicle system including: a position information reception unit that receives position information from a satellite positioning system; a first control unit that includes the position information reception unit or is connected to the position information reception unit, and has a first conversion process unit that converts the datum of the position information; a communication line connected to the first control unit; and a second control unit connected to the first control unit through the communication line. The control method includes: converting the datum of the position information received by the position information reception unit by the first conversion process unit of the first control unit; and transmitting the position information with the datum converted to the second control unit through the communication line. (Item 7) The control method of the in-vehicle system according to item 6 or 7, wherein the in-vehicle system does not include any position information reception unit that receives position information from the satellite positioning system, other than the position information reception unit.

While the in-vehicle system, the data communication system, the in-vehicle system control method, and the program control method of illustrative embodiments of the present disclosure have been described above, the present disclosure is not limited to the specifically disclosed embodiments but can be changed or modified in various ways within the gist of the disclosure.

What is claimed is:

1. A in-vehicle system comprising:
a position information reception unit configured to receive position information from a satellite positioning system;
a first control unit that includes the position information reception unit or is connected to the position information reception unit;
a communication line connected to the first control unit;
a second control unit that is connected to the first control unit through the communication line and has a first conversion process unit configured to convert a geodetic reference datum of the position information, wherein:
the first control unit is configured to transmit the position information received by the position information reception unit to the second control unit through the communication line; and
the second control unit is configured to convert a geodetic reference datum of the position information received from the first control unit by the first conversion process unit; and
a communication unit that performs wireless data communication with a server, wherein:
the first control unit includes the communication unit or is connected to the communication unit, and is configured to transmit the position information received by the position information reception unit to the second control unit through the communication line;
the second control unit is configured to convert the geodetic reference datum of the position information received from the first control unit by the first conversion process unit and transmit the position information with the geodetic reference datum converted to the first control unit through the communication line; and
the first control unit is configured to transmit the position information with the geodetic reference datum converted received from the second control unit to the server through the communication unit.

2. The in-vehicle system according to claim 1, wherein the geodetic reference datum of the position information received by the position information reception unit is a global geodetic reference datum, and a geodetic reference datum into which the geodetic reference datum of the position information is converted by the first conversion process unit is a geodetic reference datum of a region where a vehicle equipped with the in-vehicle system is located.

3. The in-vehicle system according to claim 1, wherein the in-vehicle system does not include any position information reception unit configured to receive position information from the satellite positioning system, other than the position information reception unit.

* * * * *